United States Patent [19]
Callaghan et al.

[11] Patent Number: 5,242,494
[45] Date of Patent: Sep. 7, 1993

[54] FOAMABLE COMPOSITIONS

[75] Inventors: Ian C. Callaghan, Berkshire; Elizabeth C. Cooper, Twickenham; Anne Lepre, London; Alistair S. Taylor, Camberley, all of England

[73] Assignee: British Technology Group Ltd., London, England

[21] Appl. No.: 740,400

[22] Filed: Aug. 5, 1991

[30] Foreign Application Priority Data

Aug. 10, 1990 [GB] United Kingdom ............ 9017547.2
Sep. 1, 1990 [GB] United Kingdom ............ 9019141.2

[51] Int. Cl.$^5$ .................... C04B 12/04; C04B 38/02
[52] U.S. Cl. .................................. 106/603; 106/601; 106/605; 501/39; 501/80; 501/81; 501/82; 501/83; 501/84; 501/85
[58] Field of Search ................ 106/601, 603, 605; 501/39, 80, 81, 82, 83, 84, 85

[56] References Cited

U.S. PATENT DOCUMENTS 3,095,312  6/1963  Holmes ................................. 106/603
3,661,602  5/1972  Gerow ................................. 106/603

Primary Examiner—Mark L. Bell
Assistant Examiner—Anthony J. Green
Attorney, Agent, or Firm—Nixon & Vanderhye

[57] ABSTRACT

This invention relates to a foamable silicate composition comprising (a) one or more alkali metal silicates, (b) a blowing agent, (c) a hardener which can be an acetate or a formate ester of a di-polyhydric alcohol or a polyoxyalkylene glycol and (d) a surfactant having a hydrophilic-lypophilic balance of at least 8. The formulations are readily produced by mixing the components, are pourable, pumpable and sprayable, and give rise to foams of excellent compressive strength and thermal insulation properties under ambient conditions.

28 Claims, No Drawings

FOAMABLE COMPOSITIONS

This invention relates to foamable silicate compositions and foams produced therefrom.

It is well known to produce inorganic silicate foams from a mixture of silicates, a surface active agent, a blowing agent and a hardener. In the prior art various combinations of known compounds for each of these components have been tried. Such foams have been published for example in U.S. Pat. Nos. 3,661,602, 4,464,486, 3,095,312 and GB-A-1439036. In each case a silicate foam is produced.

One of the problems of prior art foams is that they either lack compressive strength, are friable or simply take an inordinately long time to cure or are uneconomic. Each of the above pieces of prior art solve one or more of these problems but not all.

It has now been found that all these problems can be mitigated by selecting the right combination of known components.

Accordingly, the present invention is a foamable silicate composition having a pH value of at least 9 and comprising:

a) a water-soluble alkali metal silicate or mixture of alkali metal silicates wherein the molar ratio of silica to the alkali metal oxide is within the range from 2.5-3.5:1, said silicate being present in an amount of at least 20% w/w of the total foamable composition, b) a blowing agent which is a compound capable of generating a gas in situ by heat or by chemical reaction, c) a hardener which is a compound capable of liberating acetic acid or formic acid in situ under basic conditions in the composition during use, and d) a surfactant selected from one or more of anionic, cationic, ampholytic or nonionic surfactants such that it has an hydrophilic-lipophilic balance (hereafter "HLB") value of at least 8.

The water-soluble alkali metal silicates are suitably silicates of lithium, sodium or potassium, preferably sodium or potassium. The molar ratio of silica to the alkali metal oxide in the silicate is preferably about 3:1 to 3.5:1. Such alkali metal silicate compositions can be derived by mixing two or more silicates such as e.g. sodium trisilicate (60% $SiO_2$:18% $Na_2O$:10% $H_2O$) and water glass (an aqueous sodium silicate solution containing 30% $SiO_2$:12% $Na_2O$). These silicates are commercially available.

The total silica content of the foamable composition is at least 20% w/w, suitably in the range from 25 to 50% w/w, preferably from 35 to 40% w/w based on the alkali metal silicate solution used in the composition.

The blowing agent is a compound capable of generating a gas in situ by heat or chemical reaction. Suitable examples of gases that may be generated include nitrogen, oxygen, ammonia and carbon dioxide. These gases have a decided advantage over the CFC type blowing agents because they are much more user friendly and are environmentally more desirable.

It is preferable to use oxygen or a peroxy compound capable of generating oxygen in situ as the blowing agent. Specific examples of compounds capable of generating oxygen in situ include aqueous solutions of hydrogen peroxide, a percarbonate or a perborate.

The compound used to generate the blowing agent is preferably used in an amount of about 5-10% w/w based on the aqueous alkali metal silicate solution used in the composition.

The hardener capable of liberating acetic acid or formic acid in situ under the basic conditions in the composition during use is suitably an ester of these carboxylic acids, i.e. an acetate or formate ester of a dihydric alcohol, a polyhydric alcohol or a polyoxyalkylene glycol. These esters are capable of liberating the acidic function of the ester and the acidic function in turn causes the silicate to gel and harden. The amount of hardening agent used is suitably from 5 to 15% w/w, preferably from 8 to 12% w/w based on the aqueous alkali metal silicate solution used in the composition.

Specific examples of hardeners that may be used include glycol formates and acetates such as the monoformate, the diformate, the monoacetate and diacetate of ethylene glycol or propylene glycol and glycerol triacetate.

The surfactant or combination of surfactants chosen is suitably such that it
i) is capable of emulsifying the hardener,
ii) does not make the resultant foam brittle or friable and
iii) gives the composition good foaming ability.

A surfactant combination which has these attributes suitably has an HLB value in the range from 9 to 16, preferably from 11 to 15.

Specific examples of surfactants that may be combined to obtain the desired characteristics include:
i) the ampholytic alkyl betaines of the formula

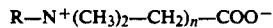

$$R-N^+(CH_3)_2-CH_2)_n-COO^-$$

wherein R is a $C_8$-$C_{18}$ alkyl or alkaryl group and n=1 to 4, a more specific example of which is Tegobetaine L7 (ex Goldschmidt);

ii) the anionic alkyl benzene sulphonates of the formula

$$C_nH_{2n}\text{-arylene-}SO_3^- M^+$$

where n=4-28, preferably 10-15, e.g. 12 which has an HLB value of about 11 to 12;

iii) the nonionic polyoxyalkylene ethers of the formula

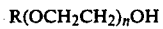

$$R(OCH_2CH_2)_nOH$$

wherein R is a $C_8$-$C_{18}$ alkyl or alkaryl group and n=5 to 40, specific examples of which include the TRITONS (Regd. Trade Mark) e.g.

Triton X-100 (isooctyl phenoxypolyethoxy ethanol) where n=10 and the HLB value is 13.5

Triton X-114 (octyl phenoxypolyethoxy ethanol) where n=7 and the HLB value is 12.4

Triton X-405 (p-tert-octyl phenoxypolyethoxy ethanol) where n=40 and the HLB value is 17.9;

iv) a water-soluble nonionic fluorosurfactant such as FLOURAD FC-170C and -171C (Regd Trade Mark, ex 3M's)

v) water-soluble silicone surfactants; and vi) a cationic onium compound such as the fatty trialkyl ammonium halides e.g. cetyl trimethyl ammonium bromide, cetyl dimethyl ethyl ammonium bromide, lauryl trimethyl ammonium chloride, stearyl trimethyl ammonium chloride and the like which have an HLB value ranging from 8 to 12.

The cationic surfactants have a tendency to introduce friability or brittleness to the foam. Therefore it may be preferably to use as little of the cationic onium compounds as possible or avoid them altogether.

The amount of surfactant (having an HLB value within the specified range) used is suitably from 1 to 5% w/w, preferably from 2 to 3% w/w based on the aqueous alkali metal silicate solution used in the composition.

Compositions described above have a viscosity of about 0.1 Nsm$^{-2}$ at 20° C. and are hence readily pumpable into areas where foam formation is desired.

It may be advantageous to use a water-dispersible polymer in the compositions of the present invention in order to improve the physical and mechanical properties of the foams produced. It is preferable to use aqueous dispersions or emulsions of such polymers. Specific examples of such polymers include the acrylic polymer emulsions such as the NEOCRYL A1060, XK62, XK90 (Regd. Trade Mark, all ex ICI), and SOKALAN PA70 PN (Regd. Trade Mark, ex BASF); the polyvinylpyrrolidones e.g. SOKALAN HP50 (Regd. Trade Mark, ex BASF); the hydroxyalkylcelluloses such as NATROSOL (Regd. Trade Mark, ex Aqualon Co); and polyoxypropylene-polyoxyethylene block copolymers such as PLURIOL 10100 (Regd. Trade mark, ex BASF).

The amount of the water-dispersible polymer, when used, in the composition is suitably at least 1% w/w, preferably from 2 to 5% w/w based on the aqueous alkali metal silicate solution used in the composition.

When preparing the composition it must be remembered that the water-dispersible polymer, if used, has to be added to the composition prior to the addition of the hardening agent. Otherwise, the hardening agent will begin gelation of the silicate before the polymer has had an opportunity to perform its function.

The composition may also optionally contain an alkali metal alkyl siliconate to control the rate of gelation of the composition. The alkali metal alkyl siliconates suitably have the general formula $$Si(R)_a(OM)_b$$

where
R is a $C_1$-$C_4$ alkyl group
M is an alkali metal
a = 1, 2 or 3 and
b = 1, 2 or 3
such that a + b = 4.

The siliconate performs the function of retarding the hardening or gelation time of the silicate in a controlled manner and enables the compressive modulus of the form to be controlled by controlling the pore size of the cells. The siliconate is capable of increasing the hardening or gelation time up to ten-fold thereby giving the composition time for greater expansion. This is an important function which ensures that the foam produced does not collapse, especially prior to hardening or gelation.

The amount of the siliconate, when used, is suitably 10% w/w or less based on the aqueous alkali metal silicate solution used in the composition, preferably from 2 to 5% w/w.

Of the siliconates falling within the general formula specified above, sodium methyl siliconate is most preferred.

As in the case of the water-dispersible polymer, the alkali metal alkyl siliconate, when used, should be added to the composition before the hardener is added. Otherwise, the siliconate is not able to control or retard the foaming step and the resultant foams may be unsatisfactory.

The compositions of the present invention suitably contain water as the main liquid medium although small amounts of organic solvents such as methanol and the like can be used. The total amount of water/solvent in the formulation prior to commencement of foaming is suitably at least 50% w/w, preferably from 60 to 70% w/w based on the total composition.

The pH of the composition is suitably above 9 and is preferably from 10–12.5 prior to commencement of the foaming step.

The compositions of the present invention may be foamed by addition of the various components within the concentration ranges specified above in the appropriate sequence specified above and then by subjecting said composition to moderate heating. The foaming temperature is suitably below 45° C., preferably from 30°–40° C.

It is preferable to form a stable microemulsion from components (b), (c) and (d) of a water-in-oil type and then to mix this microemulsion with the component (a). Thus, for instance, a microemulsion can be formed from the hardener such as glycerol triacetate, a surfactant such as a non-ionic alcohol ethoxylate and a blowing agent such as hydrogen peroxide (30% solution) in the respective proportions of 4:0.8–1:1–3 parts w/w. 10–20 parts of this microemulsion can then be mixed with an aqueous sodium silicate solution (90–80 parts, 30–40% w/w silicate). The ratio of the microemulsion to the silicate solution is preferably 1:6.

The microemulsions can be formed by techniques well known in the art such as e.g. that described in EP-A-125781 and in U.S. Pat. No. 4,541,944. The methods described in these documents are incorporated herein by reference.

The droplets in the microemulsion are typically a few nanometers in diameter. As a result, the microemulsion is substantially transparent and is almost water-like in appearance. In this method, the microemulsion suitably has a viscosity of about 0.04N s/m$^2$ and the silicate solution suitably has a viscosity of 0.05–0.5, preferably about 0.1N s/m$^2$. Thus, where a microemulsion is used, the foam is generated from a two pack system, one containing the microemulsion and the other containing the silicate solution. As soon as the two packs are mixed a solid foam can be formed in less than a minute and the product would have expanded to about double the volume of the initial components. A further advantage is that both packs are liquid and this enables accurate measurement of the components as well as facilitating homogenisation of the contents of the two packs very quickly. This is an important feature for the solidification of the compounds upon mixing is almost instantaneous.

The foamed products produced according to the process of the present invention are rigid and have a very high compressive strength. The foams are predominantly open-celled. In the foamed product, the bubble size distribution is substantially bimodal when produced using a two-pack system. That is, most bubbles are small, e.g. about 20 microns, but others are about 200 microns as appears upon examination under a scanning electron microscope.

The foamable compositions may contain other conventional ingredients such as solid fillers which may be particulate, fibrous or in the form of aggregates. The amount of these fillers will depend upon the mechanical properties desired. The fillers may be expanded clays such as perlite, vermiculite; polymer particles such as polystyrene beads; and fibres such as plastics, vegetable, glass, ceramic, mineral or metal fibres. These fillers, e.g. chopped glass fibres, improve the compressive strength of the foams and retard propagation of any cracks formed in the hardened foams even when used in concentrations as low as 0.25% w/w of the aqueous silicate solution used in the composition. Other conventional additives such as sugars, starches, resins and gums may also be included.

The compositions of the present invention give rise to foams which are not friable, not brittle, have good compressive strength and are mechanically and thermally stable. The foams produced by the process of the present invention can have compressive strengths up to 4000 kPa. Moreover, the compositions contain predominantly environmentally friendly components, have a low energy requirement and the processing costs are low.

The relatively low viscosity of the composition of the present invention prior to hardening enable the compositions to be pumped into relatively inaccessible areas where such foams have to be generated and hence is versatile.

Foams produced from the compositions of the present invention can be used amongst others:

a) for thermal insulation because of its very low thermal conductivity of around 0.06 W/m K and makes it particularly suitable for lining boilers, lagging pipes and furnaces; these foams are an excellent replacement for degraded asbestos lagging, especially on community-heating steam lines;

b) as fire resistant material due to their inability to sustain a flame;

c) as impact absorbent material (i.e. for automotive use in car dashboards with its advantage of fire resistance and, the high surface area having the ability to absorb volatile chemicals such as gasoline thereby reducing risk of explosion);

d) as catalyst supports;

e) as a reinforcing material for aluminosilicate matrices especially when such matrices are used to drape irregular shapes with a protective layer thereby giving the composite improved strength and crack resistance; and f) the two-pack system is readily pumpable, pourable and sprayable to form foams in situ thus avoiding costly downtime and excavation of installations.

The compositions of the present invention and their method of production are further illustrated with reference to the following Examples.

The following compounds were used in the Examples below:

Neocryl A1060 is a 60% solids (wt) aqueous acrylic dispersion (min. film-forming temp. (MFT) <0° C.).
Neocryl XK90=44% solids acrylic polymer emulsion MFT 18° C.
Neocryl XK62=42% solids anionic acrylic copolymer emulsion MFT 30° C.

EXAMPLE 1

To a mixture of 100 parts by weight of 38% aqueous sodium silicate solution ($SiO_2:Na_2O$ ca 3:1) was added 2 parts surfactant solution (1 part Tegobetain L7, 30% actives in water; plus 1 part Triton X-405, 70% actives in water), 7 parts of a 30% solution of hydrogen peroxide followed by 10 parts glycerol triacetate. The mixture was rapidly stirred to emulsify the hardener. Upon gelation (ca 1 min) the mixture was allowed to rise to its final foam height (ca 3–6×original liquid volume), at a temperature of ca 40° C. (<1 hour).

The dry foam had a compressive strength of ca 2000 KPa, thermal conductivity of 0.062 $Wm^{-1}K^{-1}$ at 25° C. The structure of the foam was predominantly open celled with a pore size of between 100–400 micrometers.

EXAMPLE 2

Example 1 was repeated with the addition of 2 parts of a 30% aqueous solution of sodium methyl siliconate, based on the weight of aqueous silicate solution, prior to addition of the hardener.

The resulting foam had a compressive strength of at least 1000 kPa and a pore size distribution ca 200–500 micrometers.

EXAMPLE 3

Example 1 was repeated with the addition of 0.25 parts of chopped glass fibres (average length ca 10–15 mm) based on weight of aqueous silicate solution, prior to the addition of the hardener.

The resulting foam had a compressive strength of 750–1500 kPa; the pore size was ca 100–400 micrometers.

EXAMPLE 4

Example 1 was repeated with the addition of 25 parts of Neocryl XK90 (a 44% solids acrylic polymer emulsion with a minimum film-forming temperature of <18° C.), based on weight of aqueous silicate solution, prior to the addition of the hardener.

The resulting foam had a compressive strength of 400 kPa, the pore size was ca 100–400 micrometers

EXAMPLE 5

The following is an example of a two-pack pumpable silicate foam system:

Pack 1 was a 38% w/w aqueous solution of sodium silicate ($SiO_2:Na_2O$ ca. 3:1)

Pack 2 was a stable water-in-oil type microemulsion of glycerol triacetate, surfactant and hydrogen peroxide, in the following proportions:

| | |
|---|---|
| glycerol triacetate | 50 parts |
| Ethylan CD109* Surfactant [*Registered Trade Mark] (non-ionic alcohol ethoxylate ex-Harcros) | 12.5 parts |
| Hydrogen peroxide (30% aqueous solution) | 37.5 parts |

Pack 2 was prepared by adding the hydrogen peroxide to a solution of the surfactant and the glycerol triacetate to form a microemulsion.

The solid foam was formed by mixing 20 parts w/w of the microemulsion (Pack 2) with 80 parts w/w of the silica solution (Pack 1) at room temperature (ca 25° C.).

The foams were formed within a minute of mixing Packs 1 and 2 and the product had the following physical characteristics:

Products having compressive strengths ranging from 1000–4500 kPa, cell size 20 micrometers (ca 70%) and 250 micrometers (ca 30%) were obtained in a series of experiments.

EXAMPLE 6

The following is a further Example of a two-pack pumpable silicate foam system:

Pack 1 was an aqueous solution of sodium silicate (ca 35% w/w, $SiO_2:Na_2O$, ca 3.3:1).

Pack 2 was a water-in-oil type microemulsion comprising glycerol triacetate, Ethylan CD109 (ex-Harcros) non-ionic ethoxylate surfactant and 30% w/w hydrogen peroxide aqueous solution in the respective proportions of 4: 0.8: 2 parts w/w. The resulting microemulsion was optically clear and thermodynamically stable over the temperature range of 4°-40° C.

Pack 2 was added to Pack 1 in the ratio of approximately 1:6 and adequately mixed by stirring at room temperature (ca 20° C.). Gelation and foaming occurred after 1 minute.

The foamed product so formed had open cells with a bimodal distribution of cell sizes, i.e. about 70% were of 20 micrometers and about 30% were of 250 micrometers. Compressive strength of the product was 3000 kPa.

When Example 6 was repeated, foamed products were obtained which varied in compressive strengths from 2000-4000 kPa.

We claim:

1. A foamable silicate composition having a pH value of at least 9 and comprising:
   a) at least one water-soluble alkali metal silicate wherein the molar ratio of silica to the alkali metal oxide is within the range from 2.5-3.5:1, said silicate being present in an amount of at least 20% by weight of the total foamable composition,
   b) a blowing agent which is a compound capable of generating a gas in situ by heat or by chemical reaction,
   c) a hardener which is capable of liberating acetic acid or formic acid in situ under the pH conditions in the composition, and
   d) a surfactant selected from one or more of anionic, cationic, ampholytic or non-ionic surfactants such that the surfactant has an hydrophilic-lipophilic balance, HLB, value of at least 8.

2. A silicate composition according to claim 1 wherein the alkali metal in the alkali metal silicate is selected from one or more of lithium, potassium and sodium.

3. A silicate composition according to claim 1 wherein the molar ratio of silica to the alkali metal oxide in the silicate is from 3:1 to 3.5:1.

4. A silicate composition according to claim 1 wherein the total silica content of the foamable composition is in the range from 25 to 50% by weight based on the alkali metal silicate solution in the composition.

5. A silicate composition according to claim 1 wherein the blowing agent is a compound capable of generating in situ a gas selected from nitrogen, oxygen, ammonia and carbon dioxide upon application of heat or by chemical reaction.

6. A silicate composition according to claim 1 wherein the blowing agent is a peroxygen compound capable of generating oxygen in situ.

7. A silicate composition according to claim 1 wherein the blowing agent is used in an amount of about 5-10% by weight based on the alkali metal silicate solution in the composition.

8. A silicate composition according to claim 1 wherein the hardener is used in an amount from 5 to 15% by weight based on the alkali metal silicate solution in the composition.

9. A silicate composition according to claim 1 wherein the hardener is an acetate or a formate ester of a dihydric alcohol, a polyhydric alcohol or a polyoxyalkylene glycol.

10. A silicate composition according to claim 1 wherein the hardener is selected from (i) the monoformate, the diformate, the monoacetate and the diacetate of ethylene glycol or propylene glycol and (ii) glycerol triacetate.

11. A silicate composition according to claim 1 wherein the surfactant has an HLB value in the range from 9 to 16.

12. A silicate composition according to claim 1 wherein the surfactant is selected from the group consisting of:
   (i) an ampholytic betaine of the formula $$R-N^+(CH_3)_2-(CH_2)_n-COO^-$$

wherein R is a $C_8-C_{18}$ alkyl or alkaryl group and $n=1$ to 4,
   (ii) an anionic alkylbenzene sulphonate of the formula $$C_nH_{2n}-arylene-SO_3-M^+$$

where $n=4$ to 28 and the sulphonate has an HLB value of 10-15,
   (iii) a water-soluble non-ionic polyoxyalkylene ether of the formula $$R(OCH_2CH_2)_nOH,$$

in which
   R is a $C_8-C_{18}$ alkyl or alkaryl group and $n=5$ to 40,
   (iv) a water soluble non-ionic fluorosurfactant,
   (v) a water-soluble non-ionic silicone surfactant and
   (vi) a cationic onium compound selected from the group consisting of trialkyl ammonium halides having an HLB value ranging from 8 to 12.

13. A silicate composition according to claim 1 wherein the amount of surfactant used is from 1 to 5% by weight based on the alkali metal silicate solution in the composition.

14. A silicate composition according to claim 1 wherein the composition also contains at least 1% by weight of a water-dispersible polymer based on the amount of alkali metal silicate solution in the composition.

15. A silicate composition according to claim 14 wherein the water-dispersible polymer is present in the composition in an amount from 2 to 5% by weight.

16. A silicate composition according to claim 1 wherein the composition also contains an alkali metal alkyl siliconate.

17. A silicate composition according to claim 16 wherein the alkali metal alkyl siliconate has the formula $$Si(R)_a(OM)_b$$

where
R is a $C_1-C_4$ alkyl group
M is an alkali metal
$a=1$, 2 or 3 and
$b=1$, 2 or 3
such that $a+b=4$.

18. A silicate composition according to claim 16 wherein the alkali metal alkyl siliconate used is sodium methyl siliconate.

19. A silicate composition according to claim 16 wherein the amount of alkali metal alkyl siliconate used is 10% by weight or less based on the alkali metal silicate solution in the composition.

20. A silicate composition according to claim 1 wherein the composition has a pH value from 10 to 12.5.

21. A process for producing a foamed silicate composition said process comprising mixing together components comprising:
  (a) an aqueous solution of at least one water-soluble alkali metal silicate in which the molar ratio of silica to the alkali metal oxide is in the range from 2.5–3.5:1,
  (b) a blowing agent which is a compound capable of generating a gas in situ by heat or by chemical reaction,
  (c) a hardener which is a compound capable of liberating acetic acid or formic acid in situ under basic conditions, and
  (d) an anionic, cationic, ampholytic or non-ionic surfactant which has an HLB value of at least 8.

22. A process according to claim 21 wherein the process is carried out by forming a first pack comprising a stable water-in-oil type microemulsion of components (b), (c) and (d) and a second pack comprising component (a) and then intimately mixing the first and second packs.

23. A process according to claim 22 wherein the components (b), (c) and (d) are present in the first pack in respective proportions of 1–3:4:0.8–1 when component (c) is a 30% aqueous solution.

24. A process according to claim 23 wherein 10–20 parts by weight of the first pack is mixed with 90–80 parts by weight of the second pack, wherein the second pack is a 30–40% by weight aqueous solution.

25. A process according to claim 21, the process comprising mixing together components (a), (b), (c) and (d), a water-dispersible polymer, and an alkali metal alkyl siliconate, wherein the hardener (c) is added to a preformed mixture of components (a), (b) and (d), the water dispersible polymer and the alkali metal alkyl siliconate.

26. A process according to claim 21 wherein a foam is produced comprising open cells having a bimodal distribution of cell sizes wherein about 70% of the cells have a size of about 20 micrometers and about 30% of the cells have a size of about 250 micrometers.

27. Silicate foams comprising open cells having a bimodal cell distribution in which about 70% of the cells have a cell size of about 20 micrometers.

28. Silicate foams according to claim 27 wherein said foams have a compressive strength of at least 1000 kPa.

* * * * *